US008832454B2

(12) United States Patent
Khosravi et al.

(10) Patent No.: US 8,832,454 B2
(45) Date of Patent: *Sep. 9, 2014

(54) APPARATUS AND METHOD FOR RUNTIME INTEGRITY VERIFICATION (75) Inventors: Hormuzd M. Khosravi, Portland, OR (US); Vincent J. Zimmer, Federal Way, WA (US); Divya Naidu Kolar Sunder, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 818 days.

This patent is subject to a terminal disclaimer.

(21) Appl. No.: 12/317,852

(22) Filed: Dec. 30, 2008

(65) Prior Publication Data

US 2010/0169967 A1 Jul. 1, 2010

(51) Int. Cl.
*G06F 11/30* (2006.01)
*G06F 21/64* (2013.01)
*G06F 21/52* (2013.01)

(52) U.S. Cl.
CPC ........ *G06F 21/64* (2013.01); *G06F 2221/2101* (2013.01); *G06F 21/52* (2013.01)
USPC ........................................ 713/187

(58) Field of Classification Search
USPC ......... 713/156, 161, 172, 173, 187, 188, 189; 726/22–25
See application file for complete search history.

(56) References Cited

U.S. PATENT DOCUMENTS

| | | | |
|---|---|---|---|
| 6,023,586 A * | 2/2000 | Gaisford et al. | 717/178 |
| 6,571,335 B1 * | 5/2003 | O'Donnell et al. | 713/173 |
| 6,587,947 B1 * | 7/2003 | O'Donnell et al. | 713/187 |
| 6,711,675 B1 * | 3/2004 | Spiegel et al. | 713/2 |
| 7,398,389 B2 * | 7/2008 | Teal et al. | 713/164 |
| 7,409,546 B2 * | 8/2008 | Platt | 713/165 |
| 7,644,287 B2 * | 1/2010 | Oerting et al. | 713/187 |
| 7,757,097 B2 * | 7/2010 | Atallah et al. | 713/187 |
| 7,831,838 B2 * | 11/2010 | Marr et al. | 713/187 |
| 2003/0188231 A1 * | 10/2003 | Cronce | 714/52 |
| 2003/0229777 A1 | 12/2003 | Morais et al. | |
| 2005/0278563 A1 * | 12/2005 | Durham et al. | 714/4 |
| 2006/0005015 A1 * | 1/2006 | Durham et al. | 713/164 |

(Continued)

FOREIGN PATENT DOCUMENTS

EP 1369764 A2 12/2003
EP 1892839 A2 2/2008

(Continued)

OTHER PUBLICATIONS

Office Action Received for Korean Patent Application No. 10-2009-130980 mailed on Mar. 24, 2011, 5 pages.

(Continued)

*Primary Examiner* — Teshome Hailu (74) *Attorney, Agent, or Firm* — Jordan IP Law, LLC (57) ABSTRACT In some embodiments, a processor-based system may include at least one processor, at least one memory coupled to the at least one processor, a code block, and code which is executable by the processor-based system to cause the processor-based system to generate integrity information for the code block upon a restart of the processor-based system, securely store the integrity information, and validate the integrity of the code block during a runtime of the processor-based system using the securely stored integrity information. Other embodiments are disclosed and claimed.

14 Claims, 7 Drawing Sheets

(56) References Cited

U.S. PATENT DOCUMENTS

| | | | |
|---|---|---|---|
| 2006/0047955 A1 | 3/2006 | Prevost et al. | |
| 2008/0027867 A1* | 1/2008 | Forbes et al. | 705/51 |
| 2008/0104591 A1* | 5/2008 | McCrory et al. | 718/1 |
| 2008/0134321 A1* | 6/2008 | Rajagopal et al. | 726/21 |
| 2008/0163212 A1* | 7/2008 | Zimmer et al. | 718/100 |
| 2008/0244746 A1 | 10/2008 | Rozas et al. | |
| 2009/0013406 A1* | 1/2009 | Cabuk et al. | 726/22 |
| 2010/0095129 A1* | 4/2010 | Wilson | 713/187 |
| 2011/0231668 A1* | 9/2011 | Schluessler et al. | 713/187 |

FOREIGN PATENT DOCUMENTS

| | | |
|---|---|---|
| JP | 2007-528083 A | 10/2007 |
| JP | 2007257197 A | 10/2007 |
| JP | 2008226160 A | 9/2008 |
| JP | 2008234079 A | 10/2008 |
| KR | 10-2003-0095301 A | 12/2003 |
| WO | 00/28420 A1 | 5/2000 |
| WO | 2000/028420 A1 | 5/2000 |
| WO | 2005/101197 A2 | 10/2005 |

OTHER PUBLICATIONS

Extended European Search Report received for European Patent Application 09252869,4, mailed on Jul. 11, 2011, 7 Pages.

Office Action received for Japanese Patent Application 2009-292870, mailed on Dec. 6, 2011, 9 Pages including 5 pages of English Translation.

Office Action received for Chinese Patent Application 200910217300.4, mailed on Jan. 29, 2012, 22 Pages including 15 pages of English Translation.

Office Action received for European Patent Application 09252869.4, mailed on Mar. 22, 2012, 6 Pages.

Bulygin, Y. et al., "Chipset Based Detection and Removal of Virtualization Malware a.k.a. DeepWatch", Retrieved from the Internet: retrieved on Apr. 17, 2012, Aug. 6, 2008, relevant pp. 18,19, 34.

Petroni, N. et al., "Copilot—a Coprocessor-based Kernel Runtime Integrity Monitor", proceedings of the 13th usenix security proceedings of the 13th usenix security, San Diego, CA, USA; Aug. 9, 2004, 16 pages.

Embleton, S. et al., "SMM rootkits" Proceedings of the 4th International Conference on Security and Privacy in Communication Netowrks, Securecomm '08, Jan. 1, 2008, 12 pages.

Gebhardt, C et al., "Preventing hypervisor-based rootkits with trusted execution technology",Network Security, Elsevier Advanced Technology, vol. No. 11, Nov. 2000, pp. 7-12.

Extended Search Report received for European application No. 12001344.6, mailed on May 7, 2012, 11 pages.

Office Action received for Japanese Application 2009-292870, mailed on Jun. 26, 2012, 8 Pages of Office action including 4 pages of English translation.

Final Office Action Received for the Korean Patent Application No. 10-2009-130980, mailed on Mar. 29, 2012, 5 pages of Office Action including 2 pages of English translation.

Office Action received for Chinese Patent Application 200910217300.4, mailed on Nov. 5, 2012, 26 pages of Office Action including 16 pages of English translation.

Office Action received for Korean Patent Application No. 10-2009-130980, mailed on Jul. 29, 2013, 10 Pages of Office Action including 5 pages of English Translation.

\* cited by examiner

APPARATUS AND METHOD FOR RUNTIME INTEGRITY VERIFICATION

TECHNICAL FIELD

The invention relates to integrity verification. More particularly, some embodiments of the invention relate to runtime firmware integrity verification.

BACKGROUND AND RELATED ART

Processor-based systems such as computers may require or benefit from various levels of hardware and software security.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
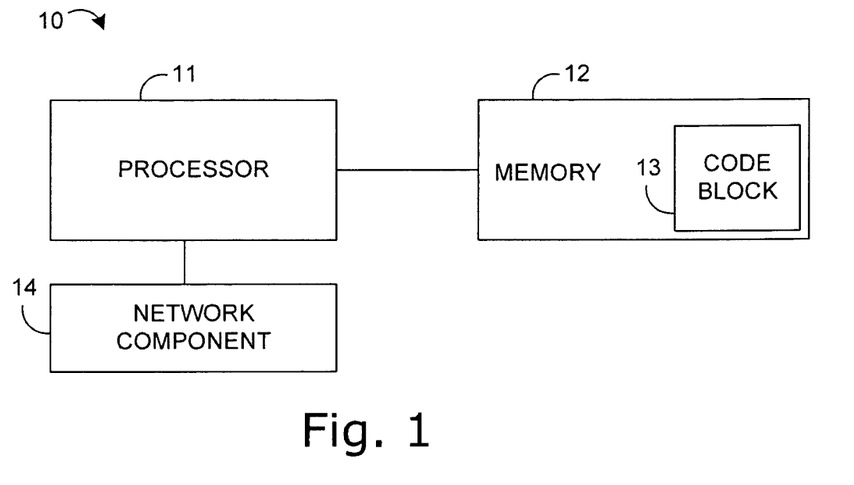
FIG. 1 is a block diagram of an electronic system in accordance with some embodiments of the invention.

With reference to FIG. 1, in accordance with some embodiments of the invention, a processor-based system 10 may include at least one processor 11, at least one memory 12 coupled to the at least one processor 11, and a code block 13 (e.g. stored in the memory 12). The system 10 may further include code which is executable by the processor-based system to cause the processor-based system 10 to generate integrity information for the code block 13 upon a restart of the processor-based system 10, securely store the integrity information, and validate an integrity of the code block 13 during a runtime of the processor-based system 13 using the securely stored integrity information. For example, the code block 13 may correspond to one of a firmware element, a basic input output system (BIOS) element, and a system management mode (SMM) element.

In some embodiments of the invention, the system 10 may further include code to cause the processor-based system 10 to periodically re-validate the integrity of the code block 13 during runtime using the securely stored integrity information. In some embodiments of the invention, the system 10 may further include code to cause the processor-based system 10 to securely store a list of integrity information corresponding to a plurality of code blocks 13. For example, in some embodiments of the invention the system 10 may further include code to cause the processor-based system 10 to scan the at least one memory 12 coupled to the at least one processor 11 for the plurality of code blocks 13 and validate the integrity of the scanned code blocks 13 during runtime using the securely stored list of integrity information. The system 10 may further include a network component 14 and code to cause the processor-based system 10 to send a remote alert if the validation fails. For example, the network component may include a wired network connection, such as an Ethernet connection, and/or a wireless network connection, such as a WiFi connection.

Figure 2:
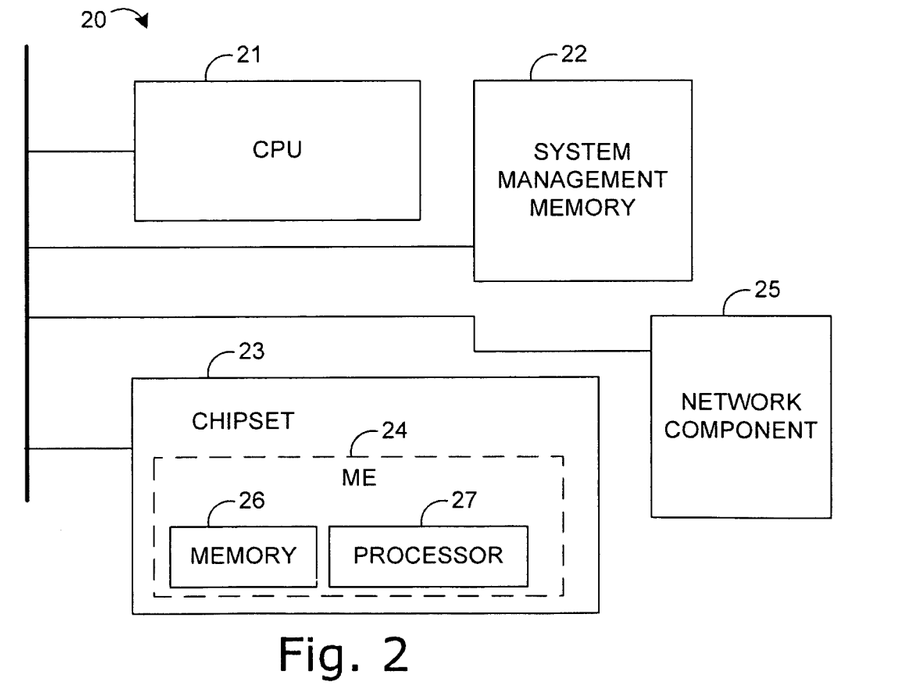
FIG. 2 is a block diagram of another electronic system in accordance with some embodiments of the invention.

With reference to FIG. 2, in accordance with some embodiments of the invention a processor-based system 20 may include at least one processor 21, a system management memory 22 coupled to the at least one processor 21, and a chipset 23 including a manageability engine 24 coupled to the at least one processor 21 and the system management memory 22. The system 20 may further include code which is executable by the processor-based system 20 to cause the manageability engine 24 of the chipset 23 to validate the contents of the system management memory 22 during a runtime of the processor-based system 20. For example, the system 20 may further include code to cause the processor-based system 20 to generate integrity information for the contents of the system management memory 22 upon a restart of the processor-based system 20, transfer the integrity information to the manageability engine 24 of the chipset 23, and securely store the integrity information in a location accessible by the manageability engine 24.

In some embodiments of the invention, the system 20 may further include code to cause the manageability engine 24 to periodically re-validate the contents of the system management memory 22 during the runtime of the processor-based system 20 using the securely stored integrity information. For example, the system 20 may further include code to cause the manageability engine 24 to scan the system management memory 22 and validate the integrity of the scanned memory 22 using the securely stored integrity information. For example, the system 20 may further include a network component 25 and code to cause the manageability engine 24 to send a remote alert if the validation fails. In some embodiments of the invention the location accessible by the manageability engine 24 may include a memory subsystem 26 of the manageability engine 24. In some embodiments of the invention the manageability engine 24 may include a separate processor 27 and at least a portion of the code may be executable by the separate processor 27 of the manageability engine 24.

Figure 3:
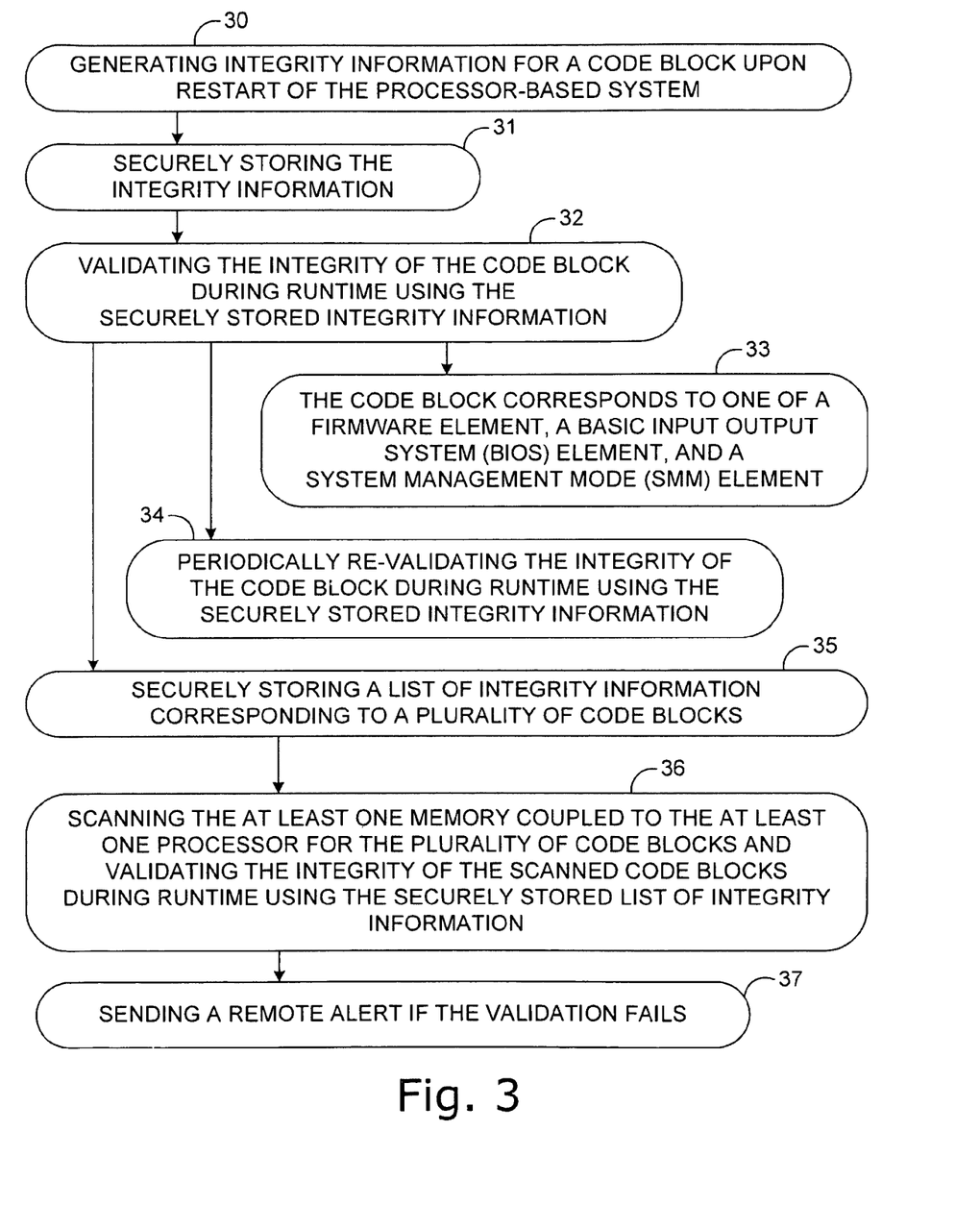
FIG. 3 is a flow diagram in accordance with some embodiments of the invention.

With reference to FIG. 3, in accordance with some embodiments of the invention a method of performing runtime integrity verification for a processor-based system may include generating integrity information for a code block upon restart of the processor-based system (e.g. at block 30), securely storing the integrity information (e.g. at block 31), and validating the integrity of the code block during runtime using the securely stored integrity information (e.g. at block 32). For example, the code block may correspond to one of a firmware element, a basic input output system (BIOS) element, and a system management mode (SMM) element (e.g. at block 33).

For example, some embodiments of the invention may further include periodically re-validating the integrity of the code block during runtime using the securely stored integrity information (e.g. at block 34). For example, some embodiments of the invention may further include securely storing a list of integrity information corresponding to a plurality of code blocks (e.g. at block 35). For example, some embodiments of the invention may further include scanning the at least one memory coupled to the at least one processor for the plurality of code blocks and validating the integrity of the scanned code blocks during runtime using the securely stored list of integrity information (e.g. at block 36). Some embodiments of the invention may further include sending a remote alert if the validation fails (e.g. at block 37).

Figure 4:
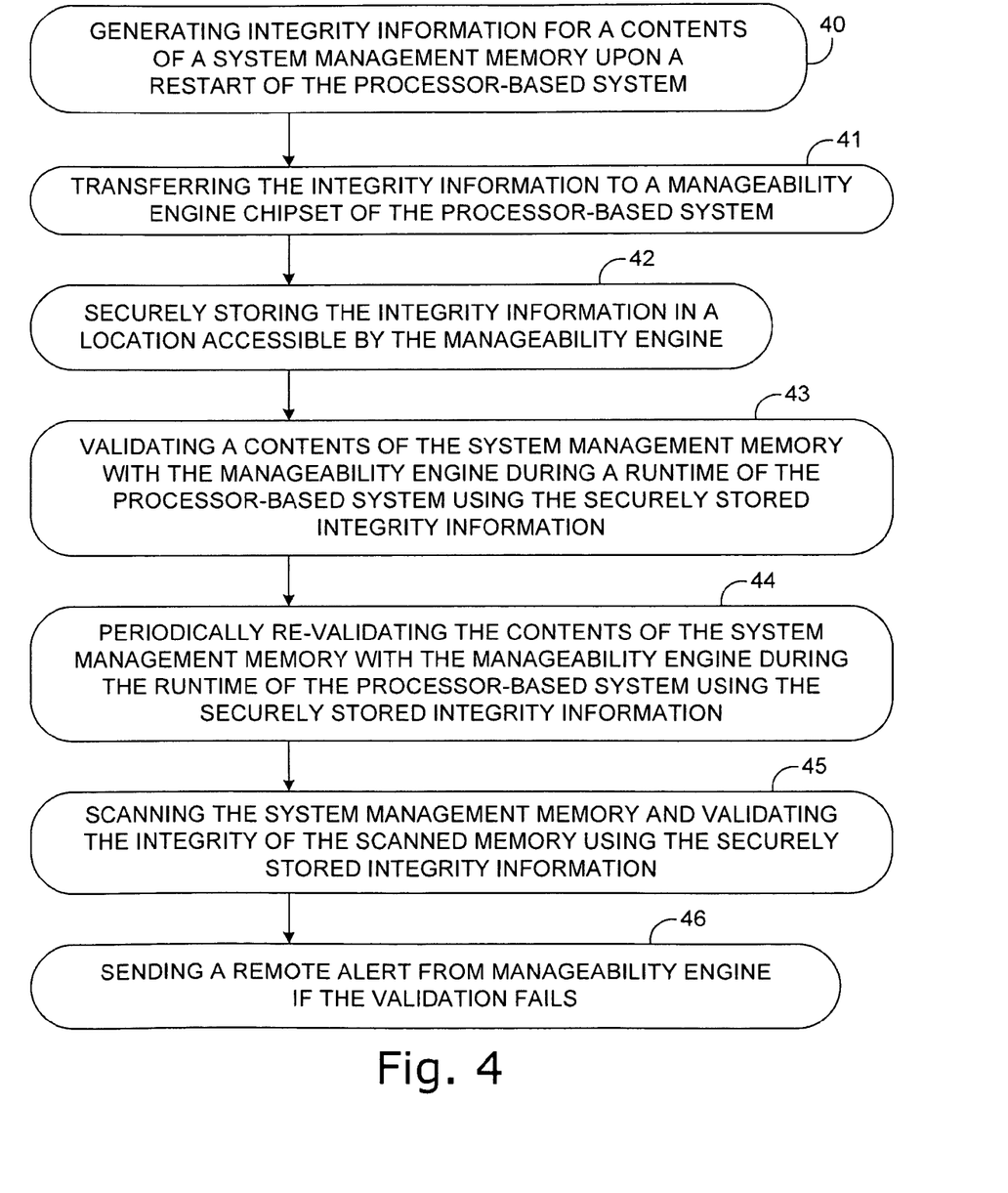
FIG. 4 is another flow diagram in accordance with some embodiments of the invention.

With reference to FIG. 4, in accordance with some embodiments of the invention a method of performing runtime integrity verification for a processor-based system may include generating integrity information for the contents of a system management memory upon a restart of the processor-based system (e.g. at block 40), transferring the integrity information to a manageability engine chipset of the processor-based system (e.g. at block 41), securely storing the integrity information in a location accessible by the manageability engine (e.g. at block 42), and validating a contents of the system management memory with the manageability engine during a runtime of the processor-based system using the securely stored integrity information (e.g. at block 43).

For example, some embodiments of the invention may further include periodically re-validating the contents of the system management memory with the manageability engine during the runtime of the processor-based system using the securely stored integrity information (e.g. at block 44). For example, some embodiments of the invention may further include scanning the system management memory and validating the integrity of the scanned memory using the securely stored integrity information (e.g. at block 45). For example, some embodiments of the invention may further include sending a remote alert from manageability engine if the validation fails (e.g. at block 46).

Advantageously, some embodiments of the invention may provide a method and/or apparatus for System Management Mode (SMM) runtime integrity verification using the Manageability Engine (ME)/Chipset. Various security efforts have focused on trusted boot or boot time integrity for SMM/BIOS and operating system (OS). For example, pre-OS Unified Extensible Firmware Interface (UEFI)/BIOS platform integrity verification may be performed at install-time (e.g., signed update) and/or at boot-time (verified load). Advantageously, some embodiments of the invention may improve security against runtime attacks such as Time Of Check (during load of code in pre-OS)/Time Of Use (when code invoked during runtime, for example in response to an SMI event) (TOCTOU) attacks and/or code injection attacks. For signed updates with the UEFI SMM executable PE COFF images using Authenticode or some other public-key based mechanism with an embedded signature block, the ME can also remotely verify with a Certificate Authority to see if the public verification key associated with the image has been revoked.

For example, some embodiments of the invention may utilize a chipset manageability engine to provide runtime integrity verification of SMM handlers (BIOS Code). Advantageously, some embodiments of the invention may defeat runtime attacks against SMM, may be OS independent, and may provide scalability for different revisions of SMM code.

Advantageously, some embodiments of the invention may also guard against runtime attacks on the OEM's Unified Extensible Firmware Interface (UEFI) runtime tables that may be co-located with operating system kernels during runtime. Advantageously, utilizing a hardware based chipset manageability engine for providing runtime integrity verification in accordance with some embodiments of the invention may provide a more secure and isolated place in the platform as compared to software based security.

An SMM rootkit may be malicious rootkit software that runs in a protected part of a computer's memory which may be difficult to detect with antivirus software. For example, the SMM rootkit may include malicious features such as keylogging and/or communications software that could be used to steal sensitive information. Advantageously, some embodiments of the invention may guard against SMM rootkit attacks.

In accordance with some embodiments of the invention, an SMI handler may be implemented as follows: When entering the SMM the processor may jump to the physical address SMBASE+0x8000 (which means that the SMI handler must be located at the offset 0x8000 inside the SMRAM). Because when the D_OPEN bit is set code may be put in the SMRAM, an SMI trigger may be forced to get the code executed.

Figure 5:
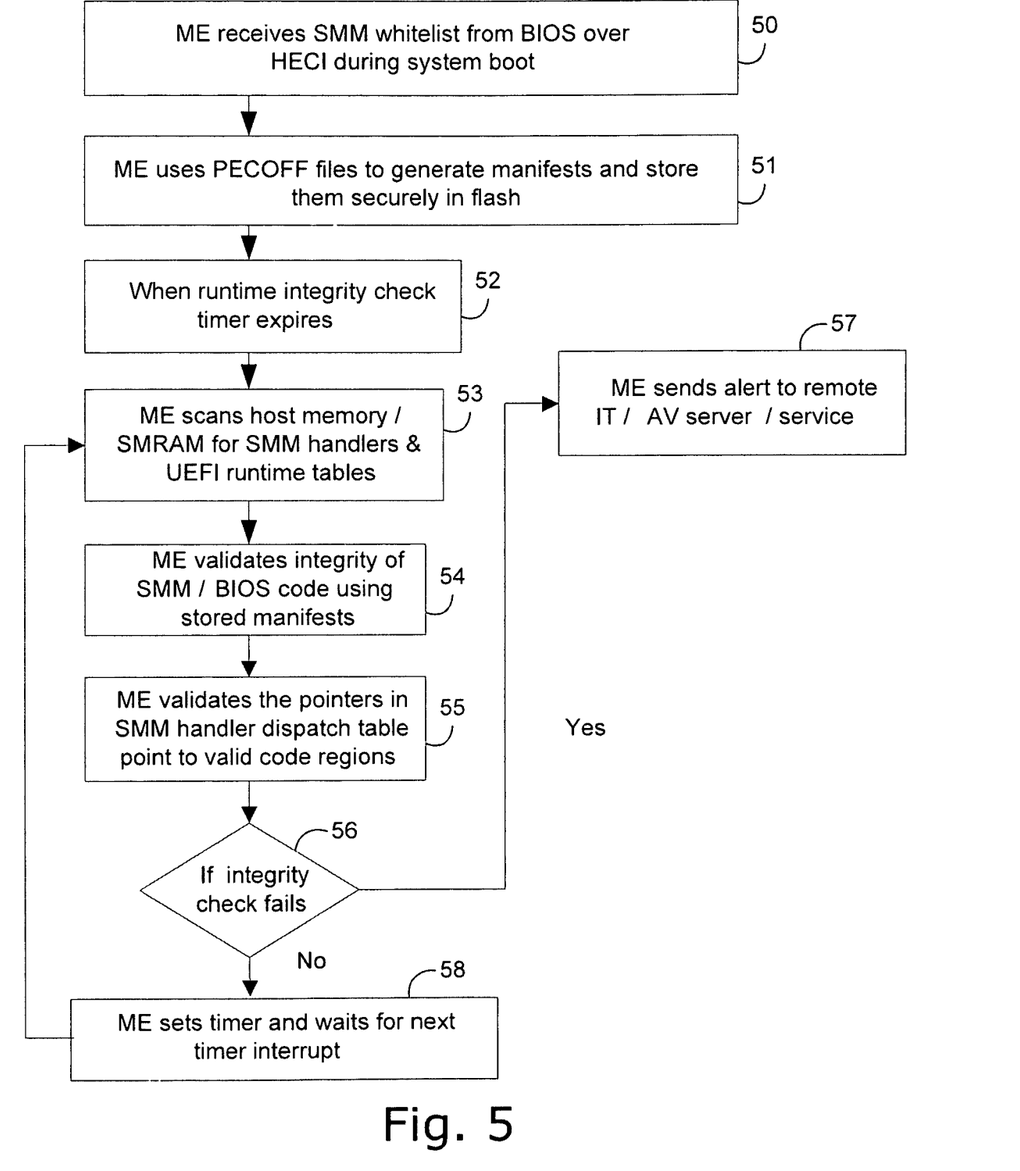
FIG. 5 is another flow diagram in accordance with some embodiments of the invention.

With reference to FIG. 5, in some embodiments of the invention, a manageability engine (ME) may receive an SMM whitelist from a BIOS over a Host Embedded Control Interface (HECI) during the system boot (e.g. at block 51). For example, a whitelist may correspond to a list of authorized code modules. For example, the manageability engine may use Portable Execution and Common Object File Format (PECOFF) files to generate manifests and store them securely in flash (e.g. at block 52). The manageability engine may periodically perform a runtime integrity verification check. For example, the manageability engine may set a runtime integrity check timer and when the timer expires (e.g. at block 52) the manageability engine may scan host memory and or system management random access memory (SMRAM) for SMM handlers and UEFI runtime tables (e.g. at block 53). The manageability engine may validate the SMM/BIOS code using the stored manifests (e.g. at block 54). The manageability engine may validate that pointers in the SMM handlers dispatch table point to valid code regions (e.g. at block 55). Advantageously, some embodiments of the invention may open access to the SMRAM to the chipset for the manageability engine to scan its contents. The chipset may provide integrity verification for SMM partly residing in SMRAM.

If the integrity check fails (e.g. at block 57), the manageability engine may send an alert to a remote IT/AV server and/or other remote service. For example, the manageability engine may also alert the user that the system may be corrupted. For example, the manageability engine may also halt execution. For example, the manageability engine may also re-store the system to a known trusted state and/or re-start the system. If the integrity check passes, the manageability engine may reset the timer and wait for the next timer interrupt (e.g. at block 58).

For example, for a UEFI-based SMM infrastructure, such as described in Volume 4 of the UEFI Platform Initialization (PI) specification at www.uefi.org, or the SMM-CIS at www.intel.com/technology/framework, there is a policy-based dispatcher. This policy-based dispatcher may discover and load a series of UEFI PE/COFF (http://www.microsoft.com/whdc/system/platform/firmware/PECOFF.mspx) executables into System Management RAM (SMRAM). Some embodiments of the invention may implement the following pseudo-code:

```
For each UEFI SMM Driver D_raw_i in Firmware Volume FV_j (
    If D_raw_i meets integrity constraint (
        Load D_raw_i into SMRAM
        Relocate D_raw_i for its SMRAM-based execution address
        Now have D_relocated_i in SMRAM
        If exist HECI interface (
            Pass D_relocated_i to ME via HECI in order to
            store for runtime whitelisting
        )
    )
)
```

For example, some embodiments of the invention may implement the following pseudo-code:

```
from [SmmBase.c]
// Load UEFI DXE SMM driver into SMRAM
Status = mPeLoader->LoadPeImage (
        mPeLoader, mImageHandle, Args->FilePath,
        Args->SrcBuffer, Args->SrcSize, Address,
        &Index, Args->ImageHandle, NULL,
        EFI_LOAD_PE_IMAGE_ATTRIBUTE_NONE
        );
if (!EFI_ERROR (Status) || Status ==
EFI_BUFFER_TOO_SMALL) {
    return EFI_INVALID_PARAMETER;
}
// Register the Image w/ the ME
CheckAndFixHeciForAccess ( );
if (!EFI_ERROR (Status) || Status ==
EFI_BUFFER_TOO_SMALL) {
    return EFI_INVALID_PARAMETER;
}
HeciIntegrityPacket->ImageBase = Args->SrcBuffer;
HeciIntegrityPacket->ImageSize = Args->SrcSize;
Status = HeciPacketSend(HeciIntegrityPacket);
if (!EFI_ERROR (Status) || Status ==
EFI_BUFFER_TOO_SMALL) {
    return EFI_INVALID_PARAMETER;
}
```

In contrast with the above flow, an SMM rootkit may attempt to add code into System Management RAM (SMRAM) sometime after the above load sequence. The rootkit could install itself via a BIOS bug, such as not setting the D_LCK bit in the chipset which makes SMRAM inaccessible (which BIOS normally sets prior to running option ROM's or booting the OS) http://www.cs.ucf.edu/~czou/research/SMM-Rootkits-Securecom08.pdf, or via a hardware attack, such as a cache-attack wherein T-SEG is aliased to main memory attack code http://risesecurity.org/papers/smm-_hack.txt. Or the SMM rootkit could enter SMRAM via use of BIOS Framework API's that have not been terminated https://www.blackhat.com/presentations/bh-usa-07/Heasman/Presentation/bh-usa-07-heasman.pdf.

Figure 6:
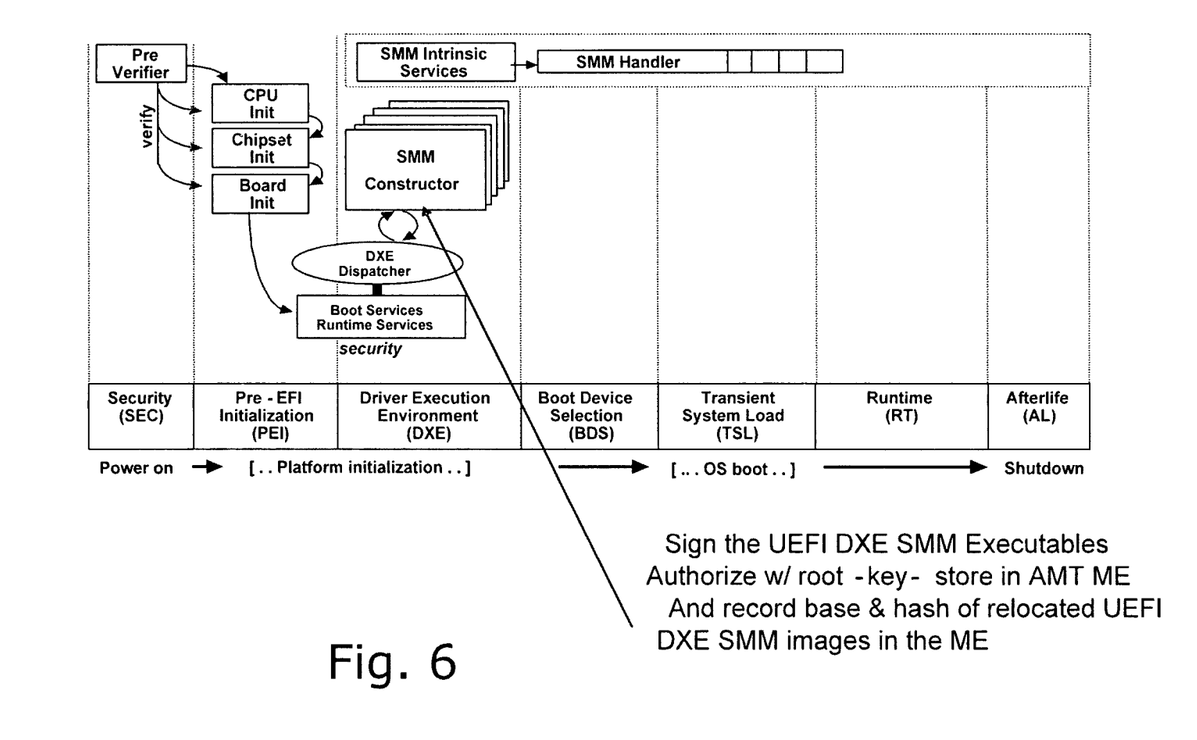
FIG. 6 is another flow diagram in accordance with some embodiments of the invention.

With reference to FIG. 6, an example overall UEFI boot-flow in accordance with some embodiments of the invention includes a power-on (or restart) and a platform initialization including a Pre-EFI stage and a Driver Execution Environment (DXE) stage. A subset of this boot-flow in the DXE stage is the loading of SMM drivers. In accordance with some embodiments of the invention, integrity information related to SMM drivers may be generated during the system boot and transferred to the manageability engine. For example, information related to the signed UEFI DXE SMM executables authorized with root-keys may be stored in the manageability engine. For example, the base and hash of the relocated UEFI DXE SMM images may be recorded in the manageability engine.

Figure 7:
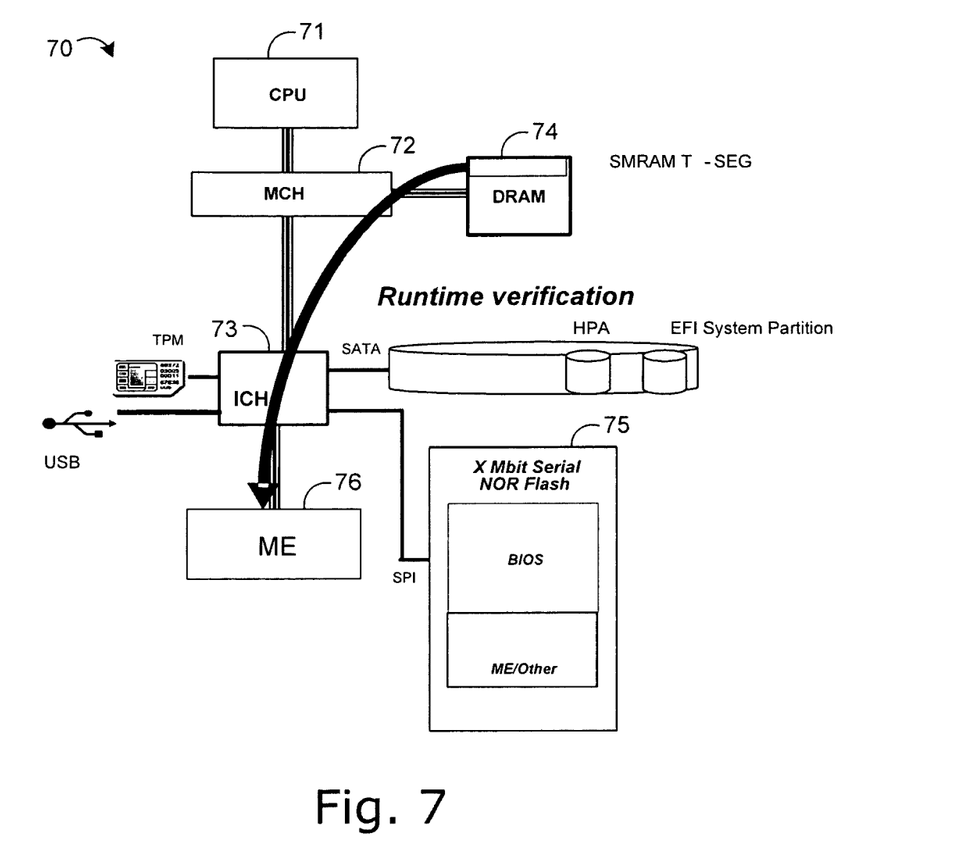
FIG. 7 is a block diagram of another electronic system in accordance with some embodiments of the invention.

With reference to FIG. 7, an electronic system 70 in accordance with some embodiments of the invention may include a CPU 71 coupled to a memory control hub (MCH) 72 and an I/O control hub (ICH) 73. For example, a main memory DRAM 74 may be coupled to the MCH 72. For example, the ICH 73 may support various I/O interfaces including SATA and USB. For example, a flash memory 75 storing BIOS code, manageability engine (ME) code, and other system code may be coupled to the ICH 73. For example, a chipset 76 including a manageability engine (ME) may be coupled to the ICH 73. A segment of the DRAM 74 may be designated as system management memory (SMRAM). For example, a top segment of the SMRAM may be referred to as T-SEG. In some embodiments of the invention, the T-SEG SMRAM may be monitored at runtime by the Manageability Engine (ME) in the chipset 76.

Figure 8:
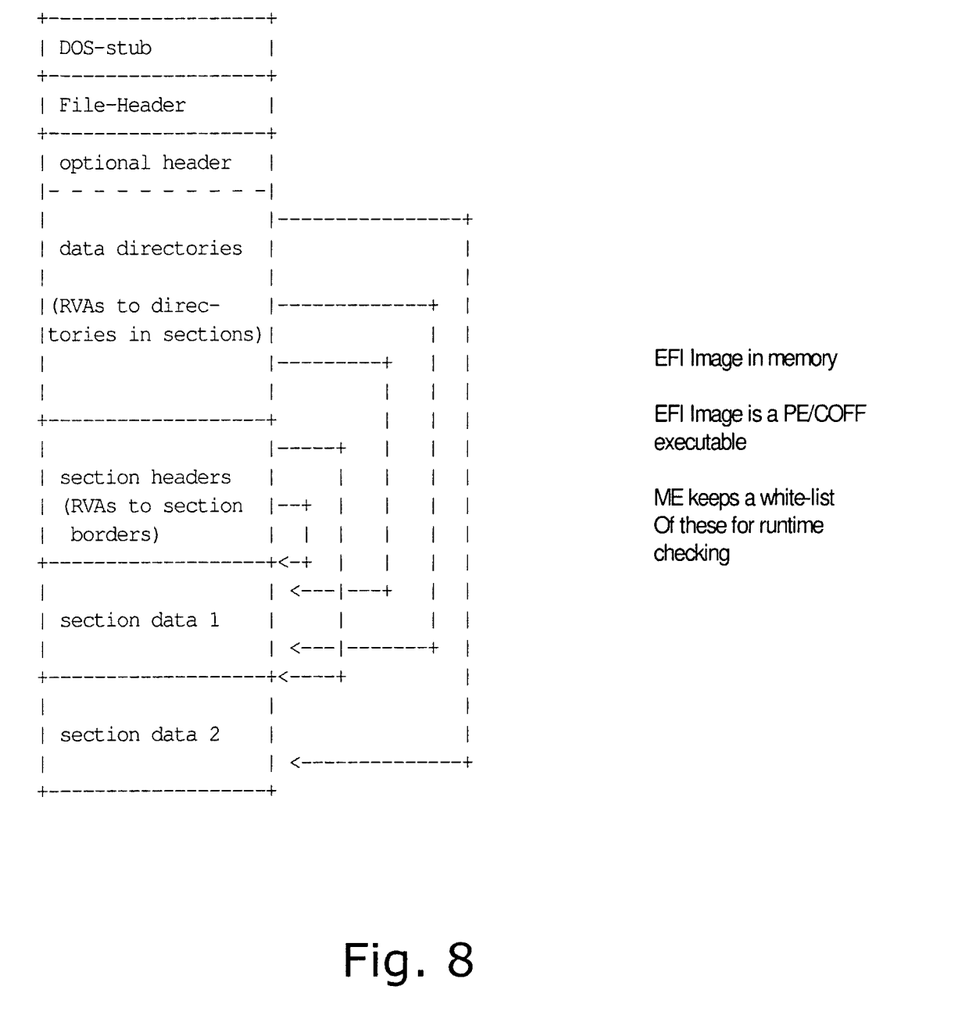
FIG. 8 is a diagram of an example file structure.

With reference to FIG. 8, an example PECOFF executable file may have a file structure as illustrated. For example, A PECOFF executable may constitute an object under observation by the ME. For example, the T-SEG may be populated by a series of PECOFF executable images for the UEFI Pi SMM infrastructure. Any attempt to hijack or modify these executables, or executable content beyond the authorized list in SMRAM, may constitute an attack.

Advantageously, in addition to white-listing SMM at runtime, some embodiments of the invention may monitor other entities at runtime. For example, some embodiments of the invention may monitor UEFI_SYSTEM_TABLE_RUNTIME_SERVICES data objects and the associated function pointers and routines. For example, these entities may be passed from platform firmware into the OS kernel runtime in order to facilitate OS kernel runtime firmware interactions/calls, such as GetTime( ), Get/Set( ) of UEFI variables, CapsuleUpdate( ). For example, some of these entities may be co-located with the OS kernel at runtime and OS kernel protections may be utilized for these objects as Advantageously, providing runtime integrity verification by the ME to protect these code and data objects may allow for a more robust UEFI implementation.

Although many of the embodiments described herein utilize terminology associated with a particular execution environment, those skilled in the art will appreciate that the invention is not limited to these specific embodiments and that equivalent routines and/or structures may be implemented in other processor-based environments where security features are desired. Likewise, the various code modules, registers, and tables referred to herein may be described by other terminology in other platforms while providing equivalent structures and/or performing equivalent functions.

Those skilled in the art will appreciate that, given the benefit of the present description, a numerous variety of other circuits and combinations of hardware and/or software may be configured to implement various methods, circuits, and systems in accordance with the embodiments described herein and other embodiments of the invention. The examples of FIGS. 1 through 8 are non-limiting examples of suitable embodiments.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A processor-based system, comprising:
    at least one processor;
    at least one memory coupled to the at least one processor;
    a code block; and
    code which is executable by the processor-based system to cause the processor-based system to:
        generate integrity information for the code block upon a restart of the processor-based system;
        securely store the integrity information, wherein the integrity information corresponds to one or more code blocks;
        validate an integrity of the code block during a runtime of the processor-based system using the securely stored integrity information;
        securely store a list of integrity information corresponding to a plurality of code blocks; and
        scan the at least one memory coupled to the at least one processor for the plurality of code blocks and validate the integrity of the scanned code blocks during runtime using the securely stored list of integrity information.

2. The system of claim 1, wherein the code block corresponds to one of a firmware element, a basic input output system (BIOS) element, and a system management mode (SMM) element.

3. The system of claim 1, further comprising code to cause the processor-based system to:
    periodically re-validate the integrity of the code block during runtime using the securely stored integrity information.

4. The system of claim 1, further comprising:
    a network component and code to cause the processor-based system to send a remote alert if the validation fails.

5. A processor-based system, comprising:
    at least one processor;
    a system management memory coupled to the at least one processor;
    a chipset including a manageability engine coupled to the at least one processor and the system management memory; and
    code which is executable by the processor-based system to cause the manageability engine of the chipset to validate a contents of the system management memory during a runtime of the processor-based system, and further comprising code to cause the processor-based system to:
        generate integrity information for the contents of the system management memory upon a restart of the processor-based system;
        transfer the integrity information to the manageability engine of the chipset;
        securely store the integrity information in a location accessible by the manageability engine, wherein the integrity information corresponds to one or more code blocks;
        periodically re-validate the contents of the system management memory during the runtime of the processor-based system using the securely stored integrity information; and
        scan the system management memory and validate the integrity of the scanned memory using the securely stored integrity information.

6. The system of claim 5, further comprising:
    a network component and code to cause the manageability engine to send a remote alert if the validation fails.

7. The system of claim 5, wherein the location accessible by the manageability engine comprises a memory subsystem of the manageability engine.

8. The system of claim 5, wherein the manageability engine includes a separate processor and wherein at least a portion of the code is executable by the separate processor of the manageability engine.

9. A method of performing runtime integrity verification for a processor-based system, comprising:
    generating integrity information for a code block upon restart of the processor-based system;
    securely storing the integrity information, wherein the integrity information corresponds to one or more code blocks;
    validating an integrity of the code block during runtime using the securely stored integrity information;
    securely storing a list of integrity information corresponding to a plurality of code blocks: and
    scanning the at least one memory coupled to the at least one processor for the plurality of code blocks and validating the integrity of the scanned code blocks during runtime using the securely stored list of integrity information.

10. The method of claim 9, wherein the code block corresponds to one of a firmware element, a basic input output system (BIOS) element, and a system management mode (SMM) element.

11. The method of claim 9, further comprising:
    periodically re-validating the integrity of the code block during runtime using the securely stored integrity information.

12. The method of claim 9, further comprising: sending a remote alert if the validation fails.

13. A method of performing runtime integrity verification for a processor-based system, comprising:
    generating integrity information for the contents of a system management memory upon a restart of the processor-based system;
    transferring the integrity information to a manageability engine chipset of the processor-based system;
    securely storing the integrity information in a location accessible by the manageability engine, wherein the integrity information corresponds to one or more code blocks;
    validating a contents of the system management memory with the manageability engine during a runtime of the processor-based system using the securely stored integrity information;

periodically re-validating the contents of the system management memory with the manageability engine during the runtime of the processor-based system using the securely stored integrity information; and scanning the system management memory and validating the integrity of the scanned memory using the securely stored integrity information.

14. The method of claim 13, further comprising: sending a remote alert from manageability engine if the validation fails.

* * * * *